United States Patent
Gupta et al.

(10) Patent No.: US 10,936,827 B1
(45) Date of Patent: Mar. 2, 2021

(54) MACHINE EVALUATION OF TRANSLATION ACCURACY

(71) Applicant: Amazon Technologies, Inc., Seattle, WA (US)

(72) Inventors: Prabhakar Gupta, Delhi (IN); Shaktisingh P. Shekhawat, Ahmedabad (IN); Kumar Keshav, Bangalore (IN)

(73) Assignee: AMAZON TECHNOLOGIES, INC., Seattle, WA (US)

(*) Notice: Subject to any disclaimer, the term of this patent is extended or adjusted under 35 U.S.C. 154(b) by 181 days.

(21) Appl. No.: 16/169,327

(22) Filed: Oct. 24, 2018

(51) Int. Cl.
  *G06F 40/51* (2020.01)
  *G06F 40/30* (2020.01)
  *G06F 40/58* (2020.01)
  *G06F 40/289* (2020.01)
  *G06F 40/45* (2020.01)

(52) U.S. Cl.
  CPC ............ *G06F 40/51* (2020.01); *G06F 40/289* (2020.01); *G06F 40/30* (2020.01); *G06F 40/45* (2020.01); *G06F 40/58* (2020.01)

(58) Field of Classification Search
  CPC combination set(s) only.
  See application file for complete search history.

(56) References Cited

U.S. PATENT DOCUMENTS

| | | | | |
|---|---|---|---|---|
| 9,342,499 | B2* | 5/2016 | Madnani | G06F 40/253 |
| 2014/0100843 | A1* | 4/2014 | Tanaka | G06F 40/51 |
| | | | | 704/2 |
| 2015/0081270 | A1* | 3/2015 | Kamatani | G06F 40/58 |
| | | | | 704/2 |
| 2015/0179173 | A1* | 6/2015 | Cho | G06F 40/242 |
| | | | | 704/235 |
| 2018/0173696 | A1* | 6/2018 | Hosabettu | G06F 16/36 |
| 2019/0034407 | A1* | 1/2019 | Hagiwara | G06K 9/6218 |

OTHER PUBLICATIONS

Automated Translation Evaluation, Association for the Advancement of Artificial Intelligence, 2019.
Asset Translation Platform, Aug. 23, 2018.

* cited by examiner

*Primary Examiner* — Linda Wong
(74) *Attorney, Agent, or Firm* — Thomas | Horstemeyer, LLP

(57) ABSTRACT

Disclosed are various embodiments for evaluating the accuracy of a translation of a source text. Word embeddings from a first language and a second language are aligned in a shared vector space. Word pairs from the sourced text and translated text are then identified. Subsequently, similarity scores between respective word embeddings for the words in the word pair are calculated. Word pairs are then selected based on the similarity scores. The accuracy of the translation is then evaluated based at least in part on the selected word pairs.

19 Claims, 5 Drawing Sheets

Word Embeddings 219 of Two Languages Prior to Alignment
O = Word Embedding 219 of First Language
x = Word Embedding 219 of Second Language Word Embeddings 219 of Two Languages Prior to Alignment
O = Word Embedding 219 of First Language
x = Word Embedding 219 of Second Language

MACHINE EVALUATION OF TRANSLATION ACCURACY

BACKGROUND

Machine translation allows for texts in a first language to be translated into a second language by a computer using a variety of rules. However, the quality of machine translation often varies between approaches. As a result, some machine translation approaches are more accurate than others, and the accuracy of a particular machine translation approach can vary between texts.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for the automated evaluation of the accuracy of translations of a text from one language into another. Relying on various machine learning techniques, a computing device can analyze two parallel texts and determine the accuracy of a translation of one of the texts into the other text. A number of embodiments of the present disclosure can also be implemented without the use of a reference corpus to train the models used to evaluate the accuracy of a translation. While the discussion of the various embodiments of the present disclosure will use a variety of examples related to evaluating the accuracy of machine translations, these approaches can also be used to review the accuracy of translations prepared by human translators. For example, one or more embodiments of the present disclosure may be used to evaluate a translation prepared by a beginning student of a language.

Various embodiments of the present disclosure provide a number of advantages over prior approaches to evaluating the accuracy of translations. For example, the use of human translators to review the accuracy of translations often cannot scale when a high volume of evaluations is required. Moreover, the use of human translators to evaluate translation accuracy often involves a subjective measure of translation quality rather than an objective measure. While a number of computer-based approaches to evaluating translations for accuracy or quality have been used, these previous approaches often rely on a reference body of translations in order to allow for an evaluation of the accuracy of the translation. However, a sufficient number of reference translations may not be available for a given language.

Figure 1:
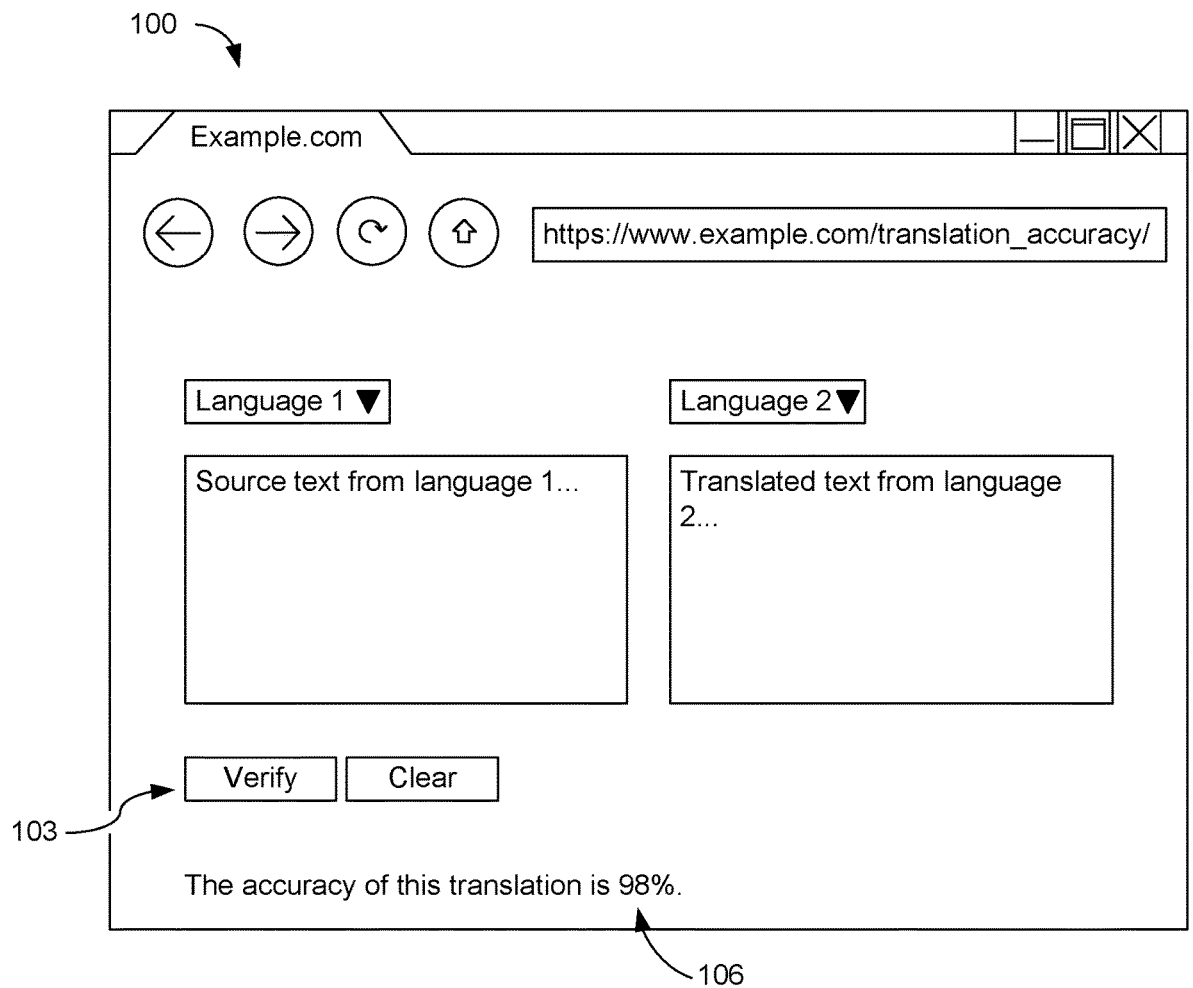
FIG. 1 is a drawing depicting one of several embodiments of the present disclosure.

To illustrate an example of the operation of various embodiments of the present disclosure, FIG. 1 depicts a user interface 100 which might be rendered to allow a user to verify the accuracy of a translation of a body of text. It should be noted, however, that users may interact with various embodiments of the present disclosure through other mechanisms than a graphical user interface (GUI) such as the user interface 100 depicted. For example, various embodiments of the present disclosure may provide an application programming interface (API) which can be invoked by another application or service.

As shown, the user interface 100 allows for a user to select or identify a first language and a second language. The user interface 100 also allows for a user to submit a first body of text and a second body of text. The user interface 100 also provides a first user interface element, such as the button 103, to allow a user to cause various embodiments of the present disclosure to verify the accuracy of the translation from the first language into the second language. A score 106 may be presented in response to an analysis performed on the submitted bodies of text. The score 106 may represent the accuracy of the translation. For example, the score 106 may correspond to a value on a scale or sliding scale. For instance, on a scale of 0-100, a score of 0 might represent a perfect translation, a score of 100 might represent a translation that is gibberish, and a score of 50 might represent a translation with average or intermediate accuracy. The inverse may also be used as a score in other embodiments of the present disclosure (e.g., a high score indicating an accurate translation and a low score indicating an inaccurate or gibberish translation).

Figure 2:
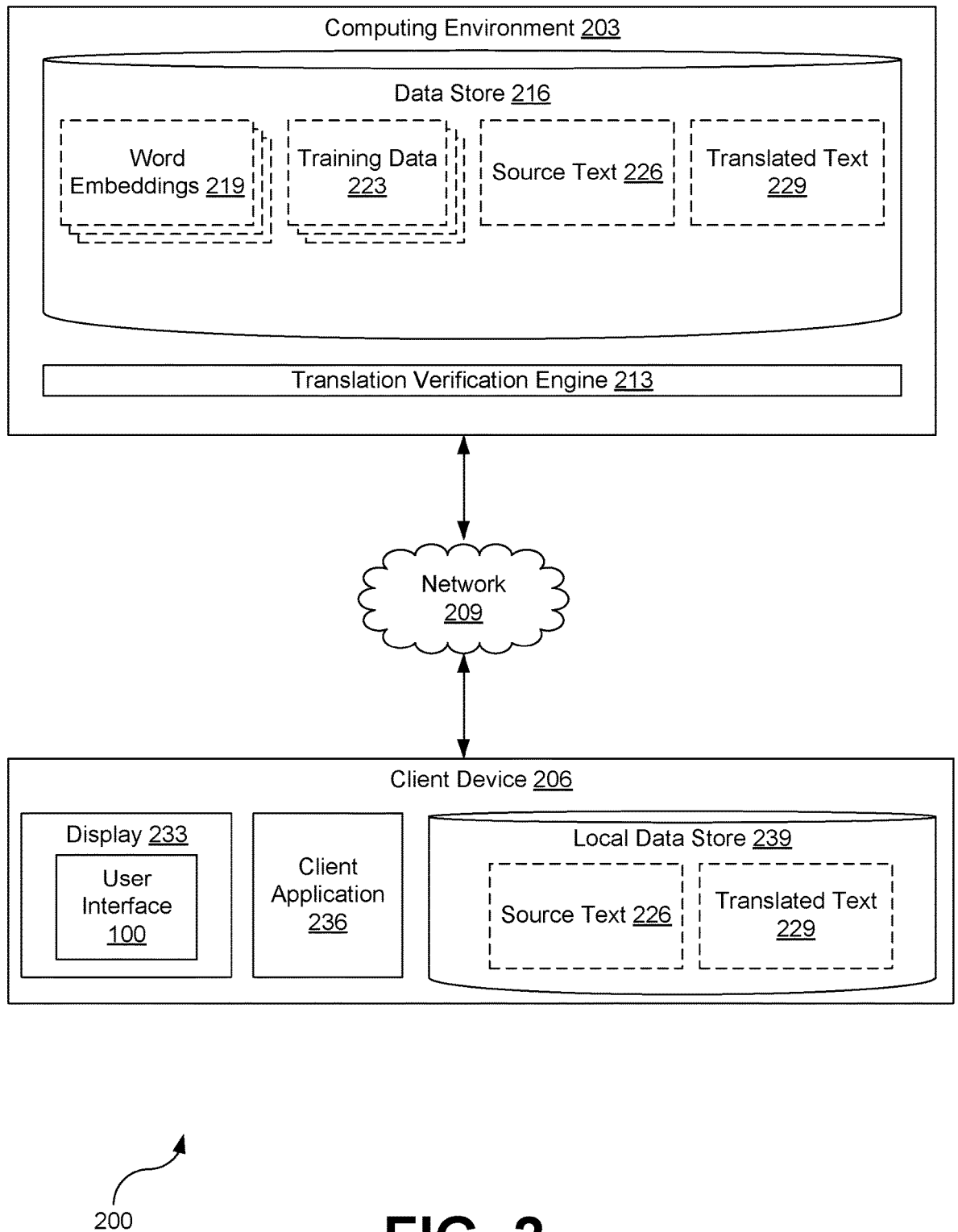
FIG. 2 is a drawing of a networked environment according to various embodiments of the present disclosure.

With reference to FIG. 2, shown is a networked environment 200 according to various embodiments. The networked environment 200 includes a computing environment 203 and potentially a client device 206, which are in data communication with each other via a network 209. The network 209 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include a translation verification engine 213, and other applications, services, processes, systems, engines, or functionality not discussed in detail herein. The translation verification engine 213 may be executed to verify the accuracy of a translation of a text. In some embodiments of the present disclosure, the translation verification engine 213 may provide an application programming interface (API) to allow other applications to invoke or make use of the functionality provided by the translation verification engine 213.

Also, various data is stored in a data store 216 that is accessible to the computing environment 203. The data store 216 may be representative of a plurality of data stores 216, which can include relational databases, object-oriented databases, hierarchical databases, hash tables or similar key-value data stores, as well as other data storage applications or data structures. The data stored in the data store 216 is associated with the operation of the various applications or functional entities described below. This data can include one or more sets of word embeddings 219, training data 223, a source text 226, and a translated text 229, as well as potentially other data.

A word embedding 219 represents one or more mappings of words or phrases in a language to one or more vectors of real numbers. Accordingly, separate word embeddings 219 or sets of word embeddings 219 may be stored for each language that can be evaluated by the translation verification engine 213. In some instances, the mapping represented by a word embedding 219 may involve a mathematical embedding from a space with one dimension per word to a continuous vector space with fewer dimensions. A word embedding 219 may be monolingual or bilingual. A monolingual word embedding 219 results from an analysis of a monolingual corpus. In some instances, monolingual word embeddings 219 of multiple languages may be mapped or aligned to the same vector space to provide for a mapping of words between languages. A bi-lingual word embedding 219 results from an analysis of parallel corpora in two different languages with cross-lingual constraints to map or align words from the two languages to the same vector space. Other types of word embeddings 219 may also be used according to various embodiments of the present disclosure.

The training data 223 represents one or more corpora of text in a language that is used to generated a respective word embedding 219 or set of word embeddings 219 for the language. Each language that is to be evaluated by the translation verification engine 213 may have its own training data 223. In some embodiments, the training data 223 for two languages may be performed from parallel corpora of text (e.g., from the same source document in two different languages). However, other embodiments may use any arbitrary corpus of text that is available in the language in question.

The source text 226 represents a first body of text in a first language. The source text 226 may be considered to be the source from which a translation will be made. Examples of source texts 226 may include short snippets of text (e.g., captions, subtitles, sentences, phrases, character strings, etc.), larger works of text (e.g., documents, scripts, articles, books, manuscripts, etc.), or smaller components of a larger work of text (e.g., a single sentence in an article, a line of dialogue in a script, a chapter in a book, etc.).

The translated text 229 represents a second body of text in a second language that is a translation of the source text 226. The translated text 229 may have been generated through a variety of approaches. For example, the translated text 229 may be the result of a machine translation of the source text 226. As another example, the translated text 229 may be the result of a human translation of the source text 226.

The client device 206 is representative of a plurality of client devices that may be coupled to the network 209. The client device 206 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 may include one or more displays 233, such as liquid crystal displays (LCDs), gas plasma-based flat panel displays, organic light emitting diode (OLED) displays, electrophoretic ink ("E-ink") displays, projectors, or other types of display devices. In some instances, the display 233 may be a component of the client device 206 or may be connected to the client device 206 through a wired or wireless connection.

The client device 206 may be configured to execute various applications such as a client application 236 or other applications. The client application 236 may be executed in a client device 206, for example, to access network content served up by the computing environment 203 or other servers, thereby rendering a user interface 100 on the display 233. To this end, the client application 236 may include, for example, a browser, a dedicated application, or other executable and the user interface 100 may include a network page, an application screen, or other user mechanism for obtaining user input. The client device 206 may be configured to execute applications beyond the client application 233 such as, for example, email applications, social networking applications, word processors, spreadsheets, or other applications.

The client device 206 may also be configured to store data in a local data store 239 that is accessible to the client device 206. The local data store 239 may be representative of a plurality of local data stores 239, which can include relational databases, object-oriented databases, hierarchical databases, hash tables or similar key-value data stores, as well as other data storage applications or data structures. The data stored in the local data store 239 is associated with the operation of the various applications or functional entities described below. This data can include a source text 226 and a translated text 229, as well as potentially other data.

Next, a general description of the operation of the various components of the networked environment 200 is provided. Although an example depiction of the operation of the various components is provided, other embodiments of the present disclosure may implement alternative operations.

To begin, the translation verification engine 213 generates one or more word embeddings 219 for a variety of languages based on corresponding training data 223. In some embodiments, the translation verification engine 213 may generate a set of monolingual word embeddings 219 for a language.

For each pair of languages, the translation verification engine 213 may align the set of word embeddings 219 for each language into a shared vector space. In other embodiments, the translation verification engine 213 may generate a set of bilingual word embeddings 219 for each pair of languages.

The translation verification engine 213 may then receive a request to verify the accuracy of a translation. The request may be received from a client application 236 executing on the client device 206 or another application executing within or hosted by the computing environment 203. In some instances, the request to verify the accuracy of the translation may include a copy of the source text 226, the translated text 229, and an indication of the language of each text. In other instances, the request may specify that a source text 226 or a translated text 229 already stored in the data store 216 be used as part of the verification process.

The translation verification engine 213 may then verify the accuracy of the translation of the source text 226 into the translated text 229. To do so, the translation verification engine 213 may perform a series of operations to determine the accuracy of the translation.

First, the translation verification engine 213 may create a list of word pairs that appear to have been correctly translated. To select the word pairs, the translation verification engine 213 may calculate a similarity score (e.g., a cosine similarity score) between each word embedding 219 representing a word in the source text 226 and each word embedding 219 representing a word in the translated text 229. For each word embedding 219 representing a word in the source text 226, another word embedding 219 in the translated text 229 with a highest similarity score may be selected. Where two separate word embeddings 219 in the source text 226 share a highest similarity score with the same word embedding 219 in the translated text 229, the pair of word embeddings 219 with the highest similarity score may be selected, as further described herein. If a word in the source text 226 or the translated text 229 lacks a word embedding 219 (e.g., because the word was not present in the training data 223 for the respective language), the word may be assigned a similarity score of zero or otherwise noted as being not similar to any other word. This can prevent a mistaken evaluation of translation accuracy based on incomplete data.

Second, the translation verification engine 213 may then eliminate incorrectly paired words included in the list of word pairs. For example, the translation verification engine 213 may remove from the list of word pairs any word pair where either word embedding 219 in the word pair is not one of the nearest neighbors of the other word embedding 219 within the shared vector space of the word embeddings 219 of the two languages of the source text 226 and the translated text 229. In some instances, the translation verification engine 213 may identify a predefined number of the nearest neighbors of a first word embedding 219 for the word pair in the shared vector space. If the second word embedding 219 for the word pair is one of the predefined number of nearest neighbors, then the translation verification engine 213 may conclude that the word embeddings 219 in the word pair are related. If the second word embedding 219 is not one of the predefined number of nearest neighbors, then the translation verification engine 213 may determine that the word pair is composed of two unrelated word embeddings 219 representing two unrelated words. The translation verification engine 213 may then remove any pairs of unrelated word embeddings 219.

Third, the translation verification engine 213 may then calculate a minimum number of edits for a sequence of words in the translated text 219 to match a sequence of words in the source text 216. For example, the translation verification engine 213 may arrange the word pairs such that the sequence of word embeddings 219 from the source text 216 matches the sequence of words as they appear in the source text 216. Because different languages have different grammar rules, syntaxes, and sentence structures, the order of the word embeddings 219 in word pairs that are from the translated text 229 may differ from the sequence that the words represented by the word embeddings 219 appear in the translated text 229. Therefore, the translation verification engine 213 may determine the minimum number of edits to the sequence of the word embeddings 219 from the translated text 229 are necessary for the order of the word embeddings 219 to match the sequence in which the words appear in the translated text 229. Fewer edits may often indicate a higher quality or more accurate translation.

Finally, the translation verification engine 213 may calculate a score representing the accuracy of the translation. The score may be based at least in part on or otherwise derived from the minimum number of edits required to have the sequence of word embeddings 219 from the translated text 229 match the order that the words appear in the translated text 229. This score may then be provided in response to the request to verify the accuracy of the translation of the source text 226 to the translated text 229.

Figure 3:
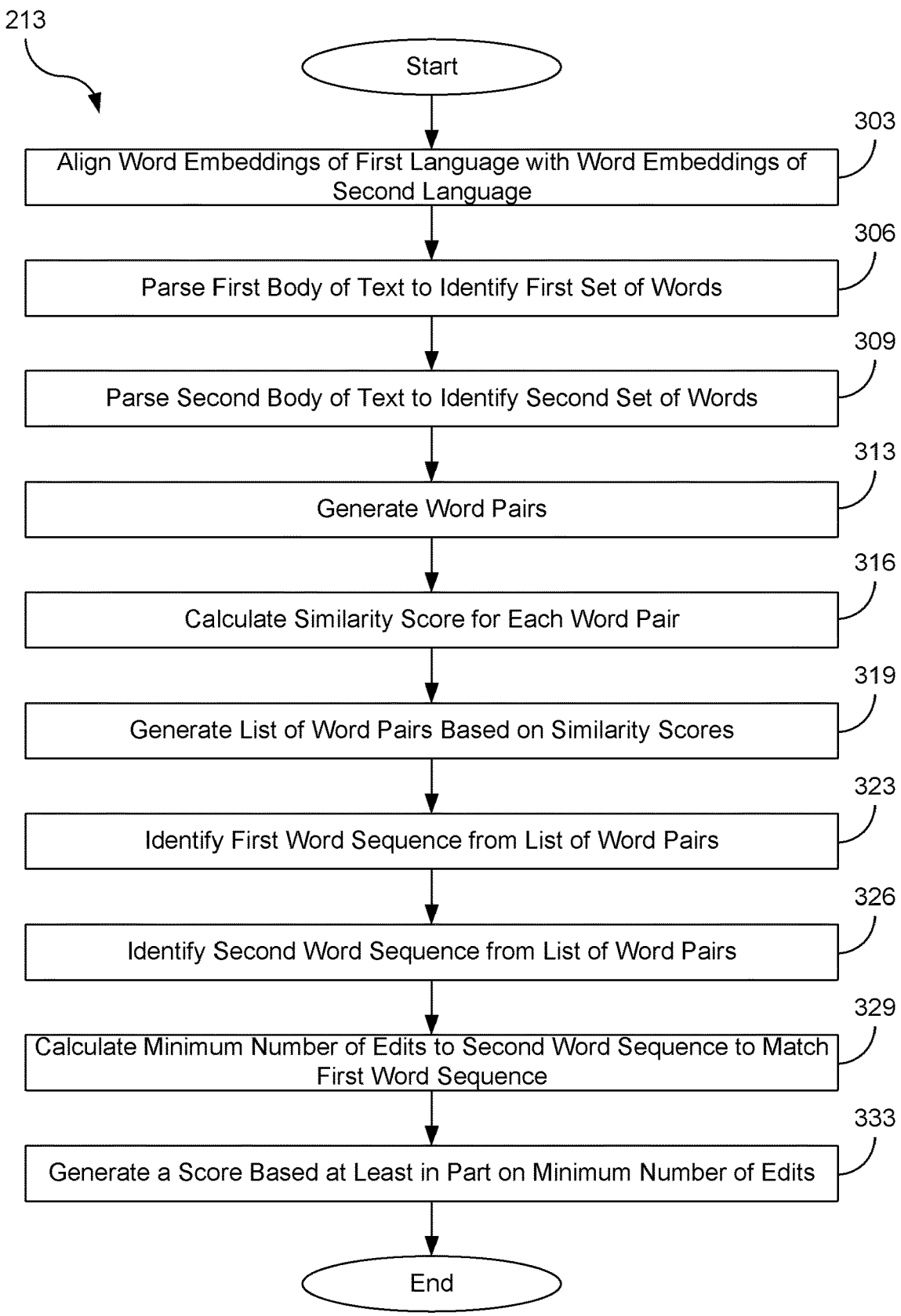
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the translation verification engine 213 according to various embodiments. It is understood that the flowchart of FIG. 3 provides merely an example of the many different types of functional arrangements that may be employed to implement the operation of the portion of the translation verification engine 213 as described herein. As an alternative, the flowchart of FIG. 3 may be viewed as depicting an example of elements of a method implemented in the computing environment 203 (FIG. 2) according to one or more embodiments.

Figure 4:
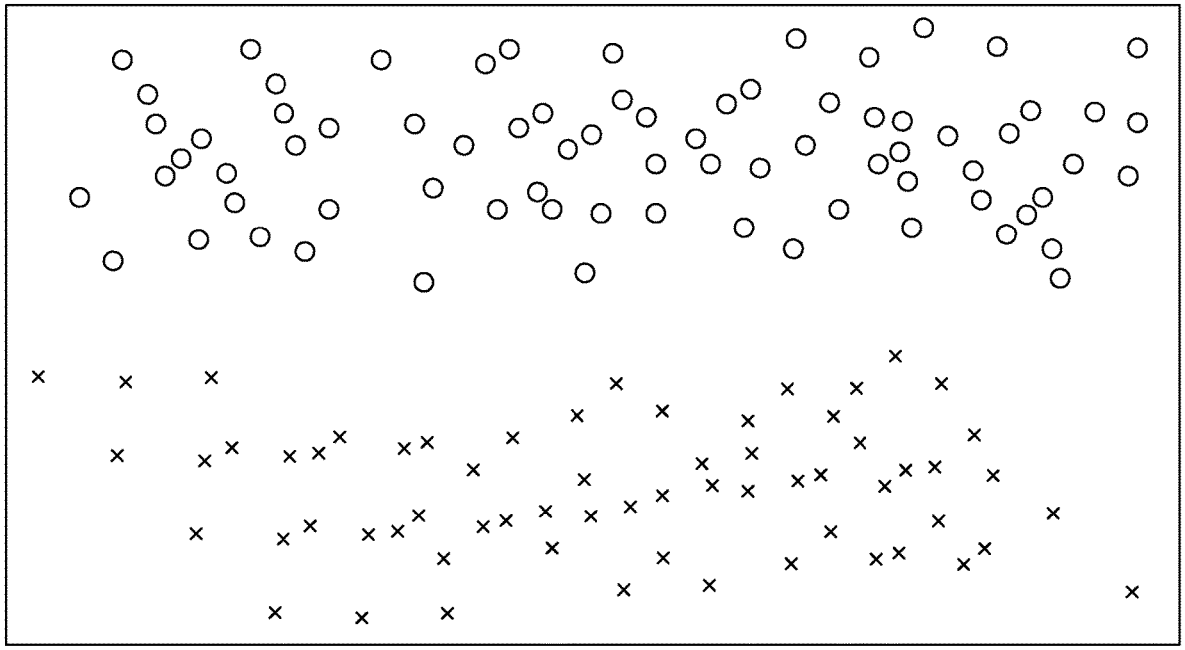
FIG. 4 is an example of an alignment of word embeddings on a shared plane according to various embodiments of the present disclosure.
Figure 4:
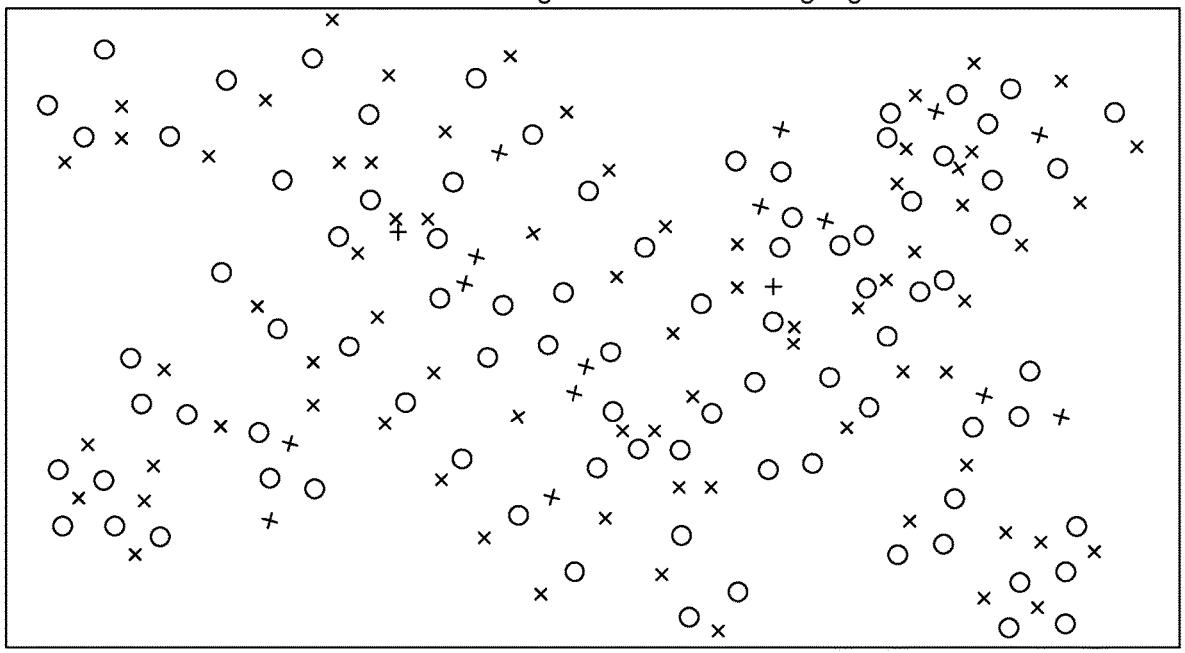

Beginning with box 303, the translation verification engine 213 may align word embeddings 219 representing words in a first language with word embeddings 219 representing words in a second language. For example, the translation verification engine 213 may perform a manifold alignment or other technique that products a projection between the two sets or word embeddings 219. The alignment of the two sets of word embeddings 219 may result in both sets of word embeddings 219 being aligned in the same plane or other shared vector space. Example mappings of word embeddings 219 from a first language and a second language before and after alignment is illustrated in FIG. 4.

Proceeding to box 306, the translation verification engine 213 parses a first body of text, such as a source text 226, to identify a first set of words in a first language. The source text 226 may be received from a number of sources. For example, the source text 226 may have been provided by a client device 206 as part of a request to verify the accuracy of the translation of the source text 226. As another example, the source text 226 may have been previously stored in the data store 216 by another process or application. In this example, the translation verification engine 213 may have received an instruction, command, or request (e.g., through an API provided by the translation verification engine 213) to verify the accuracy of the respective translated text 229.

Moving on to box 309, the translation verification engine 213 parses a second body of text, such as a translated text 229, to identify a second set of words in a second language. The translated text 229 may be received from a number of sources. For example, the translated text 229 may be been provided by a client device 206 as part of a request to verify the accuracy of the translated text 229. As another example, the translated text 229 may have been previously stored in the data store 216 by another process or application. In this example, the translation verification engine 213 may have received an instruction, command, or request (e.g., through an API provided by the translation verification engine 213) to verify the accuracy of the translated text 229.

Next at box 313, the translation verification engine 213 generates a plurality or set of word pairs formed from the words identified in the source text 226 and the translated text 229. Each word pair includes a first word from the source text 226 and a second word from the translated text 229. In some embodiments, every potential pair of words may be generated. An example of the pairs of words formed from a source text 226 in a first language and a translated text 229 in a second language is illustrated in Table 1. For illustrative purposes, Table 1 shows the corresponding word pairs that would be generated when the source text 226 has the words "Z," "Y," "X," "W," "U," and "V;" while, the translated text 229 in the second language has the words "A," "B," "C," "D," "E," "F," and "G."

TABLE 1

In some embodiments, the word pairs may also be represented as pairs of respective word embeddings 219 representing the words in the source text 226 and the translated text 229.

|  | Language 2 | | | | | | |
| --- | --- | --- | --- | --- | --- | --- | --- |
| Language 1 | A | B | C | D | E | F | G |
| Z | Z,A | Z,B | Z,C | Z,D | Z,E | Z,F | Z,G |
| Y | Y,A | Y,B | Y,C | Y,D | Y,E | Y,F | Y,G |
| X | X,A | X,B | X,C | X,D | X,E | X,F | X,G |
| W | W,A | W,B | W,C | W,D | W,E | W,F | W,G |
| U | U,A | U,B | U,C | U,D | U,E | U,F | U,G |
| V | V,A | V,B | V,C | V,D | V,E | V,F | V,G |

Proceeding to box 316, the translation verification engine 213 calculates a similarity score for each word pair previously identified at box 313. The similarity score may be calculated using a variety of approaches. For instance, the similarity score may be calculated as the cosine similarity score for the respective word embeddings 219 that represent the words in the word pair. However, if a word in the source text 226 or the translated text 229 lacks a respect word embedding 219, the similarity scores for all word pairs containing that word may be set to zero ("0") to indicate no similarity or indeterminable similarity between the words in the word pair.

Moving on to box 319, the translation verification engine 213 selects a candidate list of word pairs to use to verify the accuracy of the translated text 229. The candidate list of word pairs may be selected from the set of word pairs previously identified at box 313. For each word in the language of the source text 226, the respective word pair containing the word which has the highest similarity score may be selected. Table 2, which contains a number of example similarity scores, illustrates the approach.

TABLE 2

Highlighted in bold in Table 2 are the word pairs with the highest similarity scores - (Z,A), (Y,F), (W,G), (U,A), and (V,E). Accordingly, the translation verification engine 213 may select these word pairs.

|  | Language 2 | | | | | | |
| --- | --- | --- | --- | --- | --- | --- | --- |
| Language 1 | A | B | C | D | E | F | G |
| Z | 0.8063 | 0 | 0.2326 | 0.5569 | 0.6102 | 0.1214 | 0.3038 |
| Y | 0.2722 | 0 | 0.3314 | 0.3232 | 0.1311 | 0.5455 | 0.2217 |
| X | 0 | 0 | 0 | 0 | 0 | 0 | 0 |
| W | 0.3777 | 0 | 0.4644 | 0.2122 | 0.3457 | 0.6366 | 0.7877 |
| U | 0.7712 | 0 | 0.2215 | 0.6566 | 0.1414 | 0.3312 | 0.6866 |
| V | 0.4797 | 0 | 0.3455 | 0.3666 | 0.5775 | 0.2322 | 0.3477 |

On some occasions, however, two words from the source text 226 may have maximum similarity with the same word in the translated text 229. For instance, Table 2 illustrates that the words Z and U in the source text 226 of the first language both share maximum similarity with the word A in the translated text 229 of the second language. On these occasions, the translation verification engine 213 may select the word pair with the highest similarity score, which would be the word pair (Z,A) in this instance. Accordingly, the final set or list of word pairs selected by the translation verification engine 213 might be (Z,A), (Y,F), (W,G), and (V,E).

In some embodiments, the translation verification engine 213 may further attempt to eliminate word pairs formed by unrelated words. For example, two words in a word pair should have respective word embeddings 219 that are in proximity to each other in the shared vector space previously discussed. Accordingly, the translation verification engine 213 may determine whether the word embeddings 219 of the respective words in a word pair are nearest neighbors of each other. For example, the translation verification engine 213 may reference a configurable parameter or other predefined number. For each respective word embedding 219 of the word pair, the translation verification engine 213 may determine if the other word embedding 219 is one of the predefined number of nearest neighbors of word embedding 219.

Using the word pair (Z,A), as an example, the translation verification engine 213 may first determine if the word embedding 219 representing the word "Z" is one of the predefined number of nearest neighbors of the word embedding 219 representing the word "A." The translation verification engine 213 may then determine if the word embedding 219 representing the word "A" is one of the predefined number of nearest neighbors of the word embedding representing the word "Z." If either condition is false, then the word pair (Z,A) would be eliminated from the final set or list of word pairs selected by the translation verification engine 213. This analysis may be performed for each of the word pairs selected for inclusion in the set or list of word pairs due to the respective similarity score.

Next at box 323, the translation verification engine 213 identifies a first sequence of words in the selected word pairs based on the order of appearance of words in the source text 226. For example, given the selected word pairs of (Z,A), (Y,F), (W,G), and (V, E), the translation verification engine 213 would identify the order in the source text 226 that the words Z, Y, W, and V appear in the source text 226.

Then at box 326, the translation verification engine 213 identifies a second sequence of words in the selected word pairs based on the order of appearance of words in the translated text 229. For example, given the selected word pairs of (Z,A), (Y,F), (W,G), and (V, E), the translation verification engine 213 would identify the order in the translated text 229 that the words A, F, G, and E appear.

Proceeding to box 329, the translation verification engine 213 determines the minimum number of edits to make the second sequence of words match the first sequence of words. As an illustrative example, the translation verification engine 213 may have determined at box 326 that the words Z, Y, W, and V appear in the order WZYV in the source text 226. This creates an implied order for the words A, F, G, and E of GAFE. However, due to differences in grammar and syntax between languages, the actual order of the words A, F, G, and E in the translated text 229 might be AGFE. Accordingly, the translation verification engine 213 would determine the number of edits to the sequence AGFE in the translated text 229 to match the implied word order of GAFE based on the source text 226.

Moving on to box 333, the translation verification engine 213 can then generate a score for the accuracy of the translation of the translated text 229. In general, the higher the number of edits calculated at box 329, the less likely the translated text 229 is to be an accurate translation of the source text 226. The score may be calculated using any number of approaches. For example, the minimum number of edits may be used as the score in some embodiments of the present disclosure. In other embodiments, the score may be normalized to fit a range (e.g., 0-1; 1-5; 0-100; etc.) in order to avoid penalizing very short or very long translations. For example, a low score (e.g., 0) may reflect that no edits were required, indicating a perfect translation, while a high score indicates an inaccurate or gibberish translation. In other examples, the inverse may be used, with 0 indicating a gibberish translation and a high score indicating an accurate or perfect translation. After the score is calculated, it may be provided in response to the request for evaluation or stored in the data store 216 for later reference.

Figure 5:
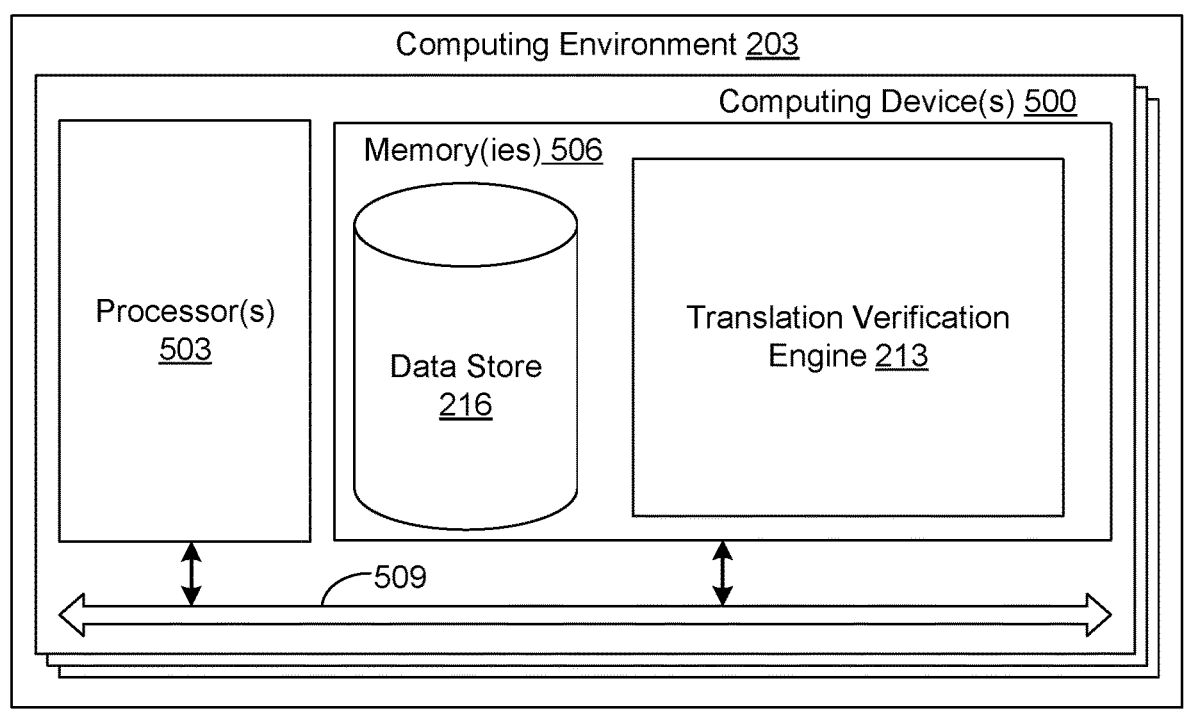
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may include, for example, at least one server computer or like device. The local interface 509 may include, for example, a data bus with an accompanying address/control bus or other bus structure as can be appreciated.

Stored in the memory 506 are both data and several components that are executable by the processor 503. In particular, stored in the memory 506 and executable by the processor 503 are translation verification engine 213, and potentially other applications. Also stored in the memory 506 may be a data store 216 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 503 may represent multiple processors 503 or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506. The local interface 509 may include additional systems designed to coordinate this communication, including, for example, performing load balancing. The processor 503 may be of electrical or of some other available construction.

Although the translation verification engine 213 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the translation verification engine 213. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 503 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches can also be used. If embodied in hardware, each block may represent a circuit or a number of interconnected circuits to implement the specified logical function or functions.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the translation verification engine 213, that includes software or code can be embodied in any non-transitory computer-readable medium for use by or in connection with an instruction execution system such as, for example, a processor 503 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the translation verification engine 213, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine readable instructions stored in the memory that, when executed by the processor, cause the computing device to at least:
parse a first text in a first language to identify a first set of words;
select a first set of word embeddings, each of the first set of word embeddings representing a respective word in the first set of words;
parse a second text in a second language to identify a second set of words;
select a second set of word embeddings, each of the second set of word embeddings representing a respective word in the second set of words;
create a set of word pairs, each word pair in the set of word pairs comprising one of the first set of word embeddings and one of the second set of word embeddings;
calculate a cosine similarity score for each of the word pairs in the set of word pairs;
select a candidate set of word pairs from the set of word pairs based at least in part on the cosine similarity score for each of the word pairs in the set of word pairs;
generate a final set of word pairs by eliminating from the candidate set of word pairs each word pair where the first word embedding is outside of a predefined number of nearest neighbors of the second word embedding or the second word embedding is outside of the predefined number of nearest neighbors of the first word embedding;
calculate a minimum number of edits to make the second text match the first text based at least in part on the final set of word pairs; and generate a score that reflects an accuracy of a translation of the first text into the second text, the score being based at least in part on the minimum number of edits.

2. The system of claim 1, wherein the machine readable instructions that cause the computing device to calculate the minimum number of edits further cause the computing device to at least:
- for each word pair in the final set of word pairs, replace in the second text the second word in each word pair of the final set of word pairs with the first word in each word pair in the final set of word pairs; and
- calculate the minimum number of edits to the second text to reorder the second text to match the first text.

3. The system of claim 1, wherein the score is further based at least in part on a precision and a recall of the second text.

4. The system of claim 1, wherein the machine readable instructions further cause the computing device to align the first set of word embeddings and the second set of word embeddings in a shared vector space.

5. A system, comprising:
- a computing device comprising a processor and a memory; and
- machine readable instructions stored in the memory that, when executed by the processor, cause the computing device to at least:
  - calculate a similarity score for a plurality of word pairs, each word pair in the plurality of word pairs comprising a first word selected from a first body of text in a first language and a second word selected from a second body of text in a second language, the second body of text being a translation of the first body of text, wherein the calculation of the similarity score further causes the computing device to at least:
    - determine that at least one second word in at least one of the plurality of word pairs is omitted from a dictionary for the second language; and
    - set the similarity score for the at least one of the plurality of word pairs to zero in response to a determination that the at least one second word is omitted from the dictionary for the second language;
  - create a list of candidate word pairs from the plurality of word pairs based at least in part on the similarity score for each word pair in the plurality of word pairs;
  - generate a final list of word pairs by eliminating from the list of candidate word pairs any word pair where the first word in the word pair is unrelated to the second word in the word pair or the second word in the word pair is unrelated to the first word in the word pair; and
  - calculate a minimum number of edits for the second body of text to match the first body of text, the minimum number of edits being based at least in part on the final list of word pairs.

6. The system of claim 5, wherein the machine readable instructions that cause the computing device to create the list of candidate word pairs from the plurality of word pairs based at least in part on the similarity score for each word pair in the plurality of word pairs further cause the computing device to at least:
- identify a set of word pairs that contain the first word;
- select a word pair from the set of word pairs with the highest similarity score for a respective second word; and
- add the selected word pair to the list of candidate word pairs.

7. The system of claim 5, wherein the machine readable instructions that cause the computing device to calculate the minimum number of edits further cause the computing device to at least:
- for each word pair in the final list of word pairs, replace in the second body of text the second word in each word pair with the first word in each word pair; and
- calculate the minimum number of edits to the second body of text to reorder the second body of text to match the first body of text.

8. The system of claim 5, wherein the machine readable instructions further cause the computing device to at least assign a score to the second body of text based at least in part on the minimum number of edits.

9. The system of claim 5, wherein the first word in the word pair is unrelated to the second word in the word pair when the first word is omitted from a set of nearest neighbors of the second word.

10. The system of claim 5, wherein the second word in the word pair is unrelated to the first word in the word pair when the second word is omitted from a set of nearest neighbors of the first word.

11. The system of claim 5, wherein the similarity score is a cosine similarity score.

12. A method, comprising:
- aligning, via a computing device, a first set of word embeddings for a first language with a second set of word embeddings for a second language;
- parsing, via the computing device, a first body of text in the first language to identify a first set of words in the first language;
- parsing, via the computing device, a second body of text in the second language to identify a second set of words in the second language;
- generating, via the computing device, a plurality of word pairs, each word pair containing a first word embedding from the first set of word embeddings that represents the first word from the first set of words and a second word embedding from the second set of word embeddings that represents the second word from the second set of words;
- calculating, via the computing device, a similarity score for each of the plurality of word pairs;
- creating, via the computing device, a list of word pairs from the plurality of word pairs based at least in part on the similarity score for each of the plurality of word pairs; and
- calculating, via the computing device, a minimum number of edits to the second body of text to match the first body of text, the minimum number of edits being based at least in part on the list of word pairs.

13. The method of claim 12, wherein creating the list of word pairs from the plurality of word pairs further comprises:
- identifying, via the computing device, a first word pair in the plurality of word pairs that shares a maximum similarity score with a second word pair in the plurality of word pairs;
- determining, via the computing device, that the first word pair has a higher similarity score than the second word pair; and
- selecting, via the computing device, the first word pair for inclusion in the list of word pairs.

14. The method of claim 12, wherein calculating, via the computing device, the minimum number of edits further comprises:
for each word pair in the list of word pairs, replacing in the second body of text the second word in each word pair with the first word in each word pair; and
calculating the minimum number of edits to the second body of text to reorder the second body of text to match the first body of text.

15. The method of claim 12, further comprising generating, via the computing device, a score for the second body of text based at least in part on the minimum number of edits, the score reflecting an accuracy of a translation of the first body of text into the second body of text.

16. The method of claim 12, wherein generating, via the computing device, the list of word pairs further comprises:
selecting, via the computing device, a predefined number of nearest neighbors for the second word in a candidate word pair;
determining, via the computing device, that the first word in the candidate word pair is one of the predefined number of nearest neighbors for the second word in the candidate word pair;
selecting, via the computing device, the predefined number of nearest neighbors for the first word in the candidate word pair; and
determining, via the computing device, that the second word in the candidate word pair is one of the predefined number of nearest neighbors for the first word in the candidate word pair.

17. The method of claim 16, further comprising adding, via the computing device, the candidate word pair to the list of word pairs in response to determining that the first word in the candidate word pair is one of the predefined number of nearest neighbors for the second word in the candidate word pair and determining that the second word in the candidate word pair is one of the predefined number of nearest neighbors for the first word in the candidate word pair.

18. The method of claim 12, wherein generating, via the computing device, the list of word pairs further comprises:
selecting the first word from the first set of words;
calculating a similarity score for each word in the second set of words; and
selecting the second word from the second set of words based at least in part on the similarity score calculated for the second word.

19. The method of claim 18, wherein calculating the similarity score for each word in the second set of words further comprises:
identifying a first word embedding representing the first word;
identifying a second word embedding representing the second word; and
calculating a cosine similarity score between the first word embedding and the second word embedding.

* * * * *